(12) United States Patent
Kim et al.

(10) Patent No.: US 7,266,074 B2
(45) Date of Patent: Sep. 4, 2007

(54) OPTICAL DISC APPARATUS AND METHOD OF REPRODUCING A WOBBLE SIGNAL

(75) Inventors: Tae-kyung Kim, Seoul (KR); Young-man Ahn, Gyeonggi-do (KR); Jong-bae Kim, Seoul (KR); Jin-kyung Lee, Gyeonggi-do (KR); Chong-sam Chung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 10/183,969

(22) Filed: Jun. 28, 2002

(65) Prior Publication Data

US 2003/0021217 A1 Jan. 30, 2003

(30) Foreign Application Priority Data

Jun. 30, 2001 (KR) ................................ 2001-38803

(51) Int. Cl.
*G11B 7/005* (2006.01)
(52) U.S. Cl. ................................. 369/124.12
(58) Field of Classification Search ............ 369/44.41, 369/53.19, 59.12, 59.15, 112.07, 112.1, 124.1, 369/124.11, 124.12
See application file for complete search history.

(56) References Cited

U.S. PATENT DOCUMENTS

| | | | | |
|---|---|---|---|---|
| 4,918,675 A | * | 4/1990 | Lee | ........................ 369/13.29 |
| 6,377,525 B1 | * | 4/2002 | Iida | ........................ 369/47.17 |
| 6,385,257 B1 | * | 5/2002 | Tobita et al. | ............... 375/334 |
| 6,826,142 B2 | * | 11/2004 | Kim et al. | .............. 369/124.12 |
| 6,891,782 B1 | * | 5/2005 | Saito et al. | ............... 369/44.29 |

FOREIGN PATENT DOCUMENTS

| | | |
|---|---|---|
| JP | 7-262583 | 10/1995 |
| JP | 9-265642 | 10/1997 |
| JP | 9-326122 | 12/1997 |
| JP | 10-83539 | 3/1998 |
| JP | 10302263 A * | 11/1998 |
| JP | 2001-148134 | 5/2001 |

OTHER PUBLICATIONS

Machine Translation of Araki (JP 09-265642).*

* cited by examiner

*Primary Examiner*—William Korzuch
*Assistant Examiner*—Joseph Haley
(74) *Attorney, Agent, or Firm*—Stein, McEwen & Bui, LLP

(57) ABSTRACT

An optical disc apparatus and a wobble signal detection method in which a light beam projected onto an optical disc and reflected by the optical disc is divided into at least four light regions in the direction corresponding to the radial direction of the optical disc to detect the light regions, and a wobble signal is detected by performing a subtraction on first and second difference signals, the first difference signal obtained by performing a subtraction on detection signals for the inner light regions of the divided and/or detected light beam and the second difference signal obtained by performing a subtraction on detection signals for the outer light regions of the divided and/or detected light beam. Accordingly, when a wobble signal is reproduced from an optical disc manufactured by a wobble modulation manner, a wobble signal is prevented from being degraded due to the interference (cross talk) from the wobbles of adjacent tracks, even though the track pitch of the optical disc is reduced to improve the recording density.

21 Claims, 11 Drawing Sheets

OPTICAL DISC APPARATUS AND METHOD OF REPRODUCING A WOBBLE SIGNAL

CROSS-REFERENCE TO RELATED APPLICATIONS

This application claims the benefit of Korean Application No. 2001-38803, filed Jun. 30, 2001, in the Korean Industrial Property Office, the disclosure of which is incorporated herein by reference.

BACKGROUND OF THE INVENTION

1. Field of the Invention

The present invention relates to the field of optical disc apparatuses, and more particularly, to an optical disc apparatus capable of reproducing a wobble signal from an optical disc manufactured by wobble modulation and to a method of reproducing a wobble signal.

2. Description of the Related Art

Recordable optical discs, such as CD-R/RW, DVD-RAM, DVD-R/RW or DVD+RW optical discs, have guide grooves formed along tracks in order to help an optical pickup to follow a desired track exactly. The guide grooves are referred to as grooves, and the remaining portions are referred to as lands. Recordable discs are classified into optical discs to record user data on only either of lands or grooves, such as CD-R/RW, DVD-R/RW or DVD+RW optical discs, and optical discs to record user data on both lands and grooves, such as DVD-RAM optical discs.

Upon manufacturing a recordable optical disc, a wobble signal to control the rotating speed of an optical disc and to obtain synchronous information is recorded on the groove tracks and/or land tracks of the recordable optical disc by changing the amplitude direction of the wobble signal.

Physical identification data (PID), which is sector address information, is also recorded upon manufacturing an optical disc, in order to recognize the physical locations on the optical disc. Recording address information on uneven prepits formed in the header area reduces the capacity of an optical disc. In addition, the above-described address information recording technique is bad in the aspect of compatibility with reproduction-dedicated optical discs. Thus, a technique of recording address information by modulating the frequency/phase/amplitude of a wobble has been proposed, which means recording of address information by adding a periodic change in frequency, phase or amplitude to a wobble signal with a single frequency.

As is well known in the technical field of the present invention, CD-R/RW optical discs record address information by frequency modulation in which the period of a wobble is modulated, whereas DVD+RW optical discs record address information by modulating the phase of a wobble. As CD-R/RW and DVD+RW optical discs record user data only on grooves, they generally can record address information on a frequency-modulated or phase-modulated wobble formed on both sidewalls of each groove track.

The restoration of address information recorded by addition to a wobble signal as described above uses a wobble signal reproduced from an optical disc.

FIG. 1 is a top view of a part of an optical disc where bi-phase shift keying (BPSK) wobble by an address-in pregroove (ADIP) manner used to format a DVD+RW optical disc, that is, bi-phase modulated wobble, is formed.

In the related art, a radial push-pull signal (tracking error signal) detected by a photodetector of an optical pickup is used as a wobble signal to restore address information on an optical disc on which wobble is formed, as illustrated in FIG. 1. If address information has been recorded on an optical disc by modulating the phase of a wobble, it is restored by extracting a wobble signal with a specific frequency from a radial push-pull signal and by demodulating the phase of the wobble signal. Accordingly, accurate reproduction of a wobble signal recorded on an optical disc is significantly important to properly restore address information. Here, a radial push-pull signal is obtained by performing a subtraction on electric signals detected from two parts into which a light beam reflected by an optical disc is divided in a direction corresponding to the radial direction of the optical disc.

However, in a conventional wobble signal reproduction manner using a radial push-pull signal, if the track pitch is narrowed to increase the recording density of an optical disc, an interference (cross-talk) due to wobbles of adjacent tracks degrades the signal-to-noise (S/N) ratio of a reproduced wobble signal. This hinders accurate restoration of address information.

SUMMARY OF THE INVENTION

Accordingly, it is an object of the present invention to provide an optical disc apparatus and a wobble signal reproducing method, capable of preventing a reproduced wobble signal from being degraded due to an interference from the wobbles of adjacent tracks during reproduction of a wobble signal from an optical disc manufactured by a wobble modulation manner.

Additional objects and advantages of the invention will be set forth in part in the description which follows and, in part, will be obvious from the description, or may be learned by practice of the invention.

In order to achieve the above and other objects of the present invention, there is provided an optical disc apparatus including a light division and/or detection device and a signal processing unit. The light division and/or detection device divides a light beam projected onto an optical disc and reflected by the optical disc into at least four light regions in the direction corresponding to the radial direction of the optical disc and detects the light regions. The signal processing unit detects a first difference signal by performing a subtraction on detection signals for the inner light regions of the divided and/or detected light beam, detects a second difference signal by performing a subtraction on detection signals for the outer light regions of the divided and/or detected light beam, and detects a wobble signal by performing a subtraction on the first and second difference signals.

In an aspect the present invention, the signal processing unit detects a wobble signal by performing a subtraction on the first and second difference signals after applying a predetermined gain to the first and/or second difference signal.

The light division and/or detection device can be implemented by a photodetector to divide an incident light beam into at least four light regions in the direction corresponding to the radial direction of an optical disc and detecting the light regions.

Alternatively, the light division and/or detection device can be implemented by including a diffraction element to divide an incident light beam into at least four light regions in the direction corresponding to the radial direction of an optical disc, and a photodetector to receive the light regions into which the light beam is divided by the diffraction element and perform a photoelectric conversion on the light regions.

In order to achieve the above and other objects of the present invention, there is also provided a method of reproducing a wobble signal, the method being carried out as follows. In this method, first, a light beam projected onto an optical disc and reflected by the optical disc is divided into at least four light regions in the direction corresponding to the radial direction of the optical disc to detect the light regions. Then, a first difference signal is obtained by performing a subtraction on detection signals for the inner light regions of the divided and/or detected light beam, and a second difference signal is obtained by performing a subtraction on detection signals for the outer light regions of the divided and/or detected light beam. Finally, a wobble signal is detected by performing a subtraction on the first and second difference signals.

According to an aspect of the invention, the method further includes applying a predetermined gain to the first and/or second difference signal.

The aforementioned optical disc has wobbles formed by an amplitude modulation manner, a frequency modulation manner, a phase modulation manner, or a saw tooth wobble manner.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
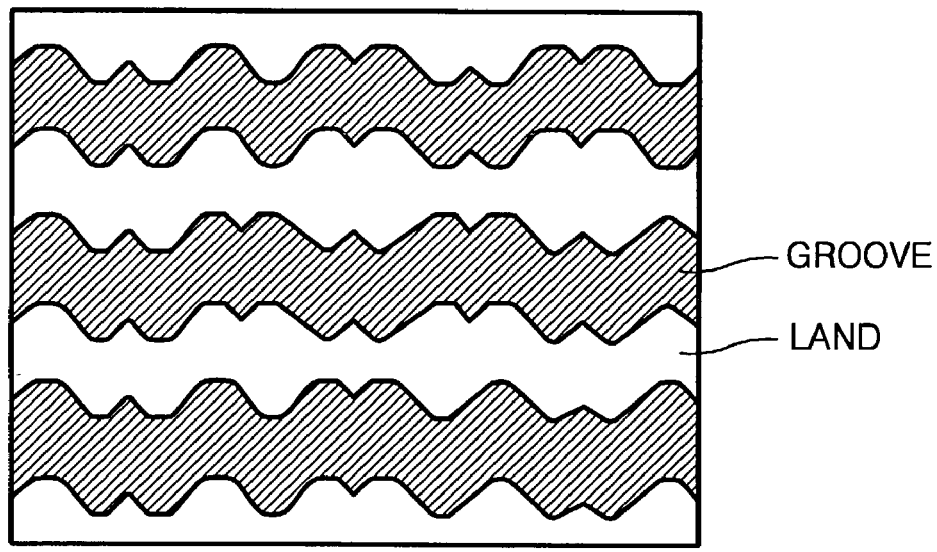
FIG. 1 is a top view of a part of an optical disc where bi-phase shift keying (BPSK) wobble by an address-in pregroove (ADIP) manner used to format DVD+RW optical discs, that is, bi-phase modulated wobble, is formed.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
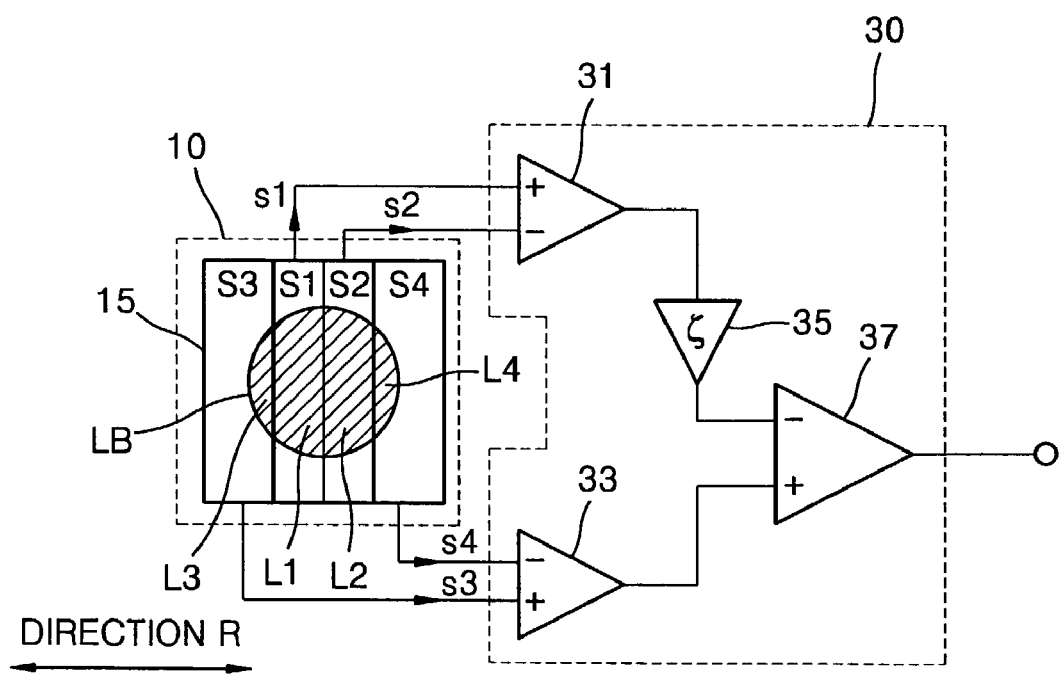
FIG. 2 is a schematic view of an optical disc apparatus according to an embodiment of the present invention.
Figure 3:
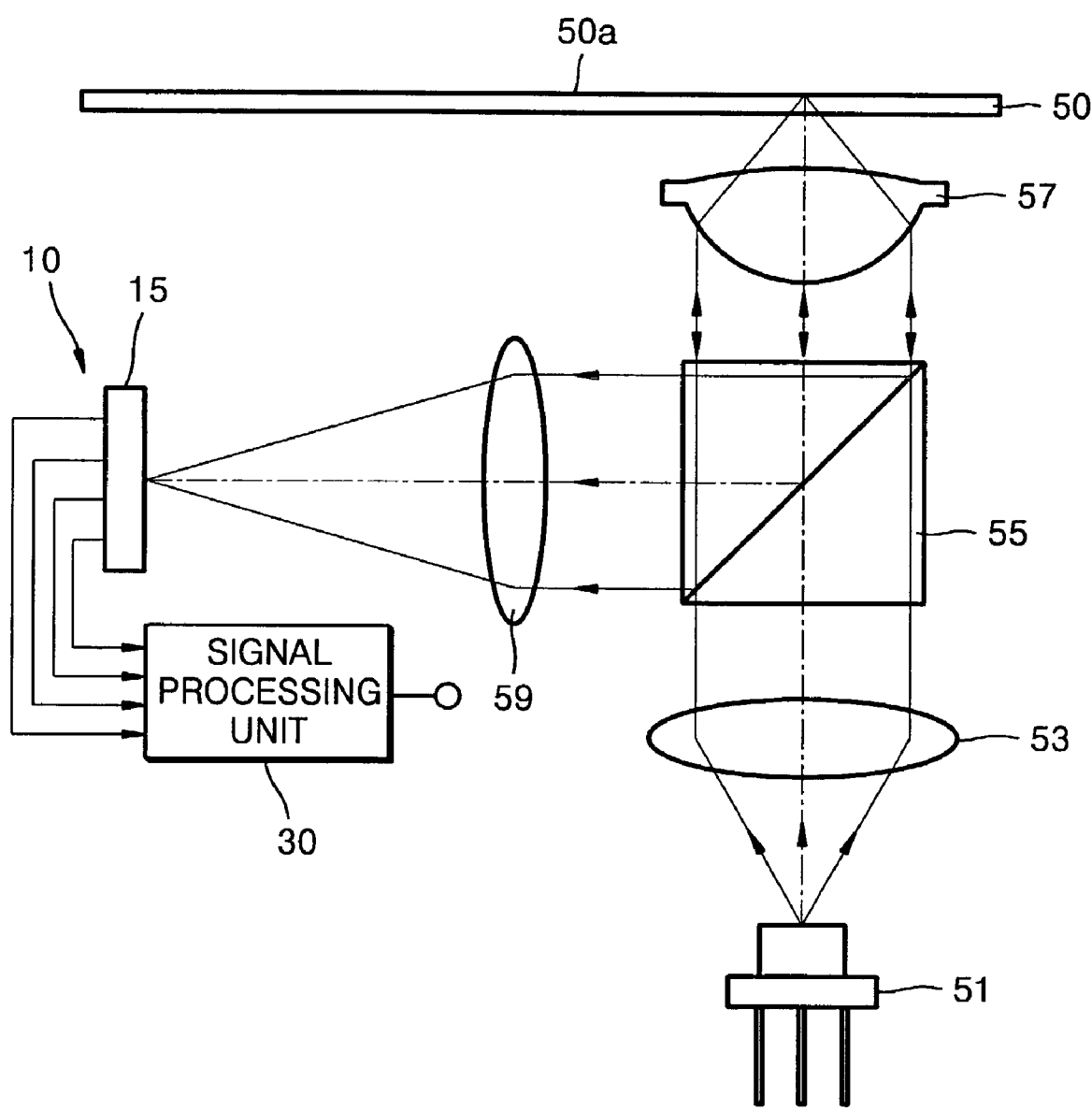
FIG. 3 illustrates an example of an optical pickup applicable to an optical disc apparatus according to an embodiment of the present invention.
Figure 4:
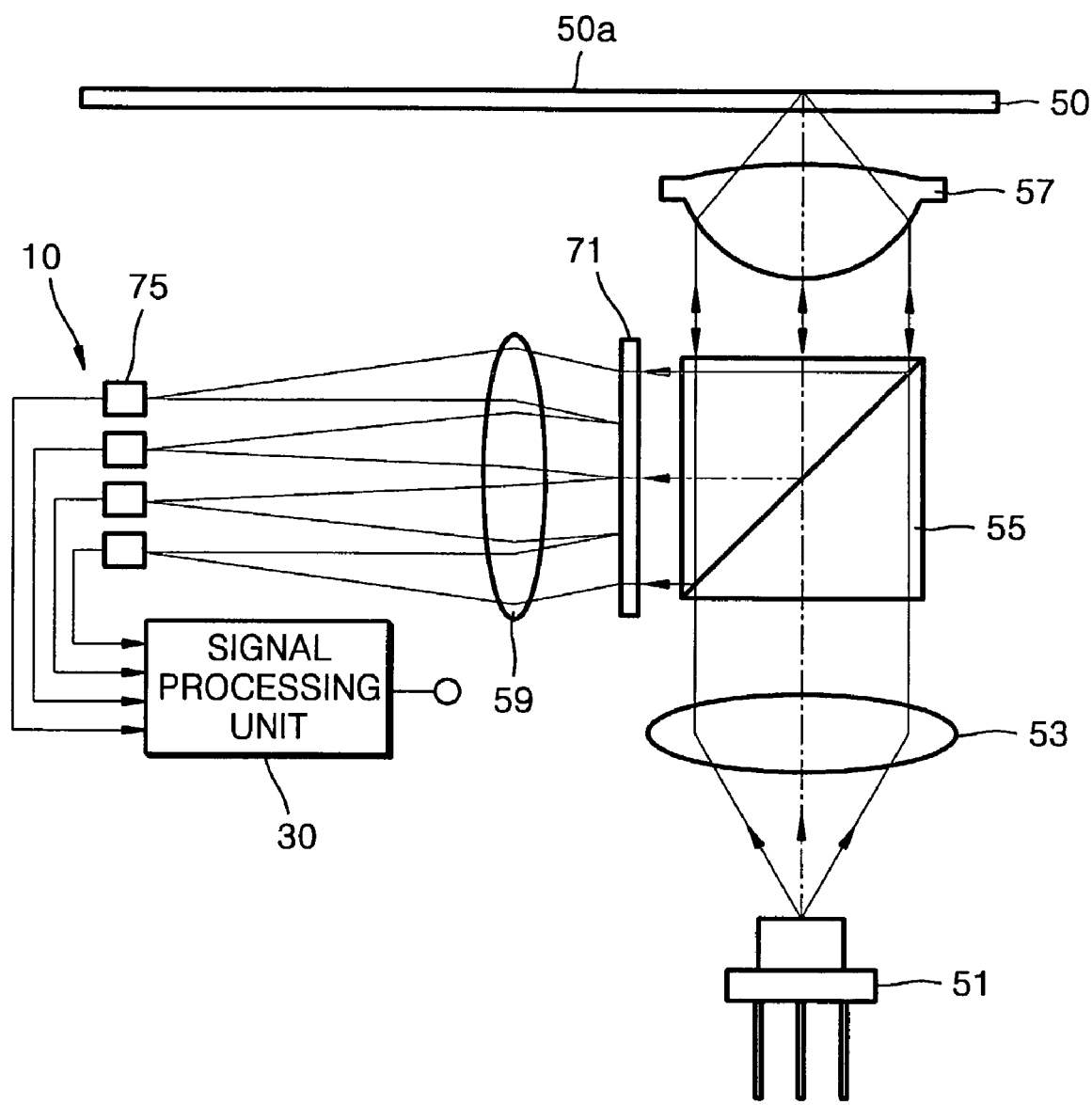
FIG. 4 illustrates an example of another optical pickup applicable to an optical disc apparatus according to an embodiment of the present invention.

FIG. 2 is a schematic view of an optical disc apparatus according to an embodiment of the present invention. FIGS. 3 and 4 show examples of an optical pickup applicable to an optical disc apparatus according to the present invention.

Referring to FIG. 2, an optical disc apparatus according to the present invention comprises a light division and/or detection device 10 and a signal processing unit 30. The light division and/or detection device 10 divides a light beam (LB) projected onto an optical disc and reflected by it into at least four regions in a direction corresponding to the radial direction of the optical disc (hereinafter, the direction is referred to as direction R) and detects the four light regions. The signal processing unit 30 is configured to detect a wobble signal from which interference from the wobbles of adjacent tracks has been nearly removed.

The light division and/or detection device 10 is adopted by an optical pickup to detect an information signal and an error signal from an optical disc. As illustrated in FIG. 2, the light division and/or detection device 10 is preferably configured so as to divide a light beam LB having been reflected by an optical disc into a pair of inner light regions L1 and L2 and a pair of outer light regions L3 and L4 in direction R, detect them and output first and second detected signals s1 and s2 for the inner light regions L1 and L2 and third and fourth detected signals s3 and s4 for the outer light regions L3 and L4.

Referring to FIGS. 2 and 3, the light division and/or detection device 10 can be implemented by a photodetector 15 divided into at least four parts. The photodetector 15 comprises a pair of inner light receiving regions S1 and S2 and a pair of outer light receiving regions S3 and S4. The inner light receiving regions S1 and S2 receive two inner light regions L1 and L2 out of four light regions into which the light beam LB reflected by a recording surface 50a of an optical disc 50 is divided in direction R, and outputs the first and second detected signals s1 and s2, respectively. The outer light receiving regions S3 and S4 receive the two remaining outer light regions L3 and L4 and output the third and fourth detected signals s3 and s4, respectively.

Referring to FIG. 4, the light division and/or detection device 10 can also be implemented by comprising a diffraction element 71 and a photodetector 75. The diffraction element 71 divides the light beam LB reflected by the optical disc 50 into at least four inner and outer light regions L1 & L2 and L3 & L4 in direction R (see FIG. 2). The photodetector 75 receives the four inner and outer light regions L1 & L2 and L3 & L4 and performs a photoelectric conversion on them to obtain first, second, third and fourth detected signals s1, s2, s3 and s4 (see FIG. 2). The diffraction element 71 can be implemented by a hologram element. The photodetector 75 can be implemented by at least four separate photo detectors as illustrated in FIG. 4 or a single photo detector comprising isolated light receiving regions.

Referring to FIGS. 3 and 4, which illustrate examples of an optical pickup applicable to an optical disc apparatus according to the present invention, a divergent light beam emitted from a light source 51 is collimated by a collimating lens 53, and the collimated light beam is incident upon an objective lens 57 through a light path changer 55. The objective lens 57 focuses the incident light beam on the recording surface 50a of the optical disc 50. A light beam reflected by the recording surface 50a of the optical disc 50 passes through the objective lens 57 and is reflected by the light path changer 55 to proceed toward the light division and/or detection device 10. As illustrated in FIG. 3, if the light division and/or detection device 10 is implemented by the photodetector 15, the light beam reflected by the light path changer 55 is condensed by a focusing lens 59 and is divided and received on the photodetector 15. As illustrated in FIG. 4, when the light division and/or detection device 10 is implemented by the diffraction element 71 and the photodetector 75, the light reflected by the light path changer 55 is divided into regions by the diffraction element 71 and the light beam regions are condensed by the focusing lens 59 and received on the photodetector 75.

Referring back to FIG. 2, the signal processing unit 30 includes first, second and third subtracting operators 31, 33 and 37. The first subtracting operator 31 performs a subtraction on the first and second detected signals s1 and s2 for the inner light regions L1 and L2, said detected signals output from the light division and/or detection device 10, to obtain the first difference signal (s1−s2). The second subtracting operator 33 performs a subtraction on the third and fourth detected signals s3 and s4 for the outer light regions L3 and L4, said detected signals output from the light division and/or detection device 10, to obtain the second difference signal (s3−s4). The third subtracting operator 37 performs a subtraction on the first and second difference signals (s1−s2) and (s3−s4) to obtain a wobble signal.

A gain adjuster 35 to apply a predetermined gain (ζ) to the first difference signal (s1−s2) may be further placed between the output terminal of the first subtracting operator 31 and the input terminal of the third subtracting operator 37. The gain adjuster 35 amplifies or reduces the first difference signal (s1−s2).

When the signal processing unit 30 has the structure of FIG. 2, a wobble signal output from the signal processing unit 30 can be represented as Equation 1:

$$\text{Wobble signal} = (s3-s4) - \zeta \cdot (s1-s2) \quad (1)$$

wherein ζ in the gain adjuster 35 is a gain applied to the first difference signal (s1−s2).

Detection of a wobble signal from which cross talk due to the wobbles of adjacent tracks has been removed by the above-mentioned optical disc apparatus according to the present invention will now be described with reference to FIGS. 5A, 5B, 6A and 6B and FIGS. 8A through 12B.

Figure 5A:
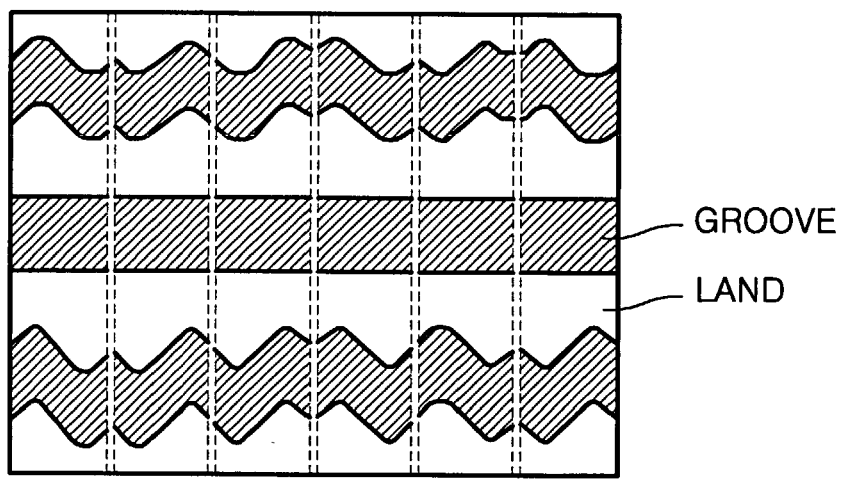
FIG. 5A is a top view of a part of an optical disc on which bi-phase shift keying (BPSK) modulated wobble is formed, wherein BPSK modulation is applied to DVD+RW optical discs.
Figure 5B:
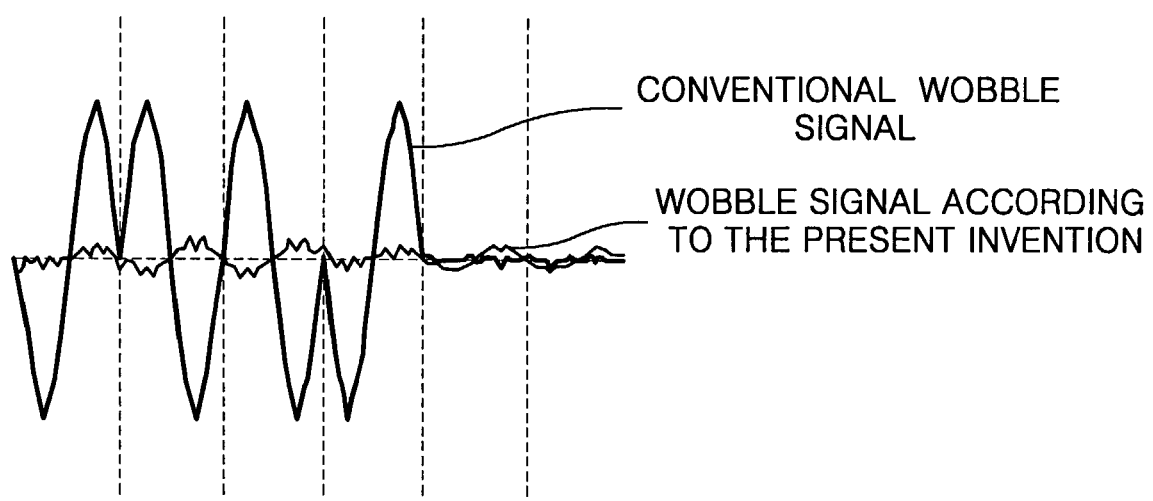
FIG. 5B is a graph illustrating a conventional wobble signal and a wobble signal according to the present invention reproduced when the non-wobbled grooves of the optical disc of FIG. 5A are reproduced.
Figure 6A:
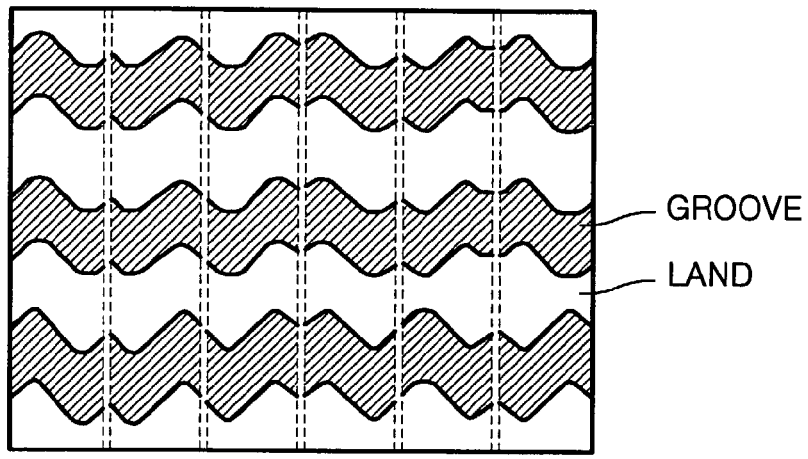
FIG. 6A is a top view of a part of an optical disc on which BPSK modulated wobble is formed, wherein BPSK modulation is applied to DVD+RW optical discs.
Figure 6B:
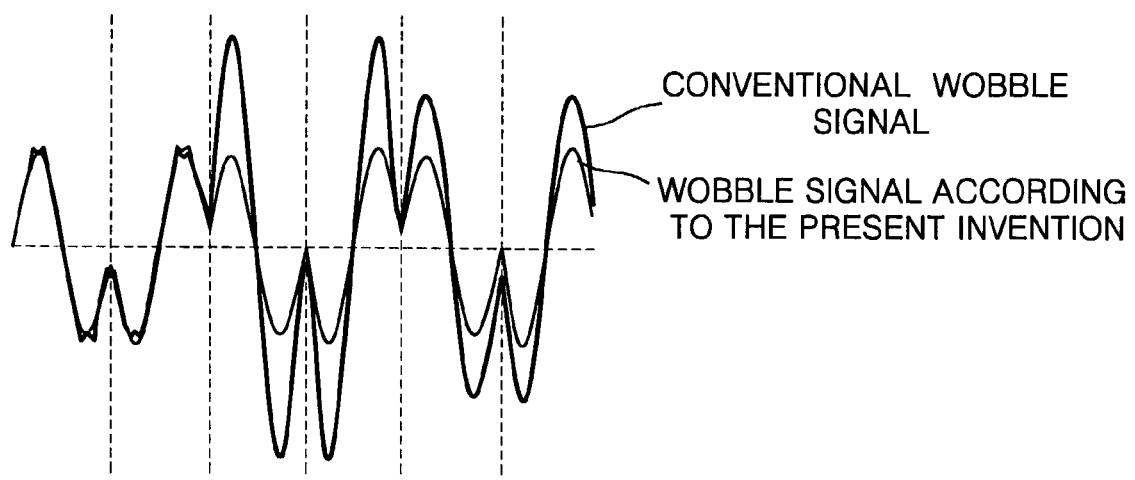
FIG. 6B is a graph illustrating a conventional wobble signal and a wobble signal according to the present invention obtained when the wobbled grooves of the optical disc of FIG. 6A are reproduced.

FIGS. 5A and 6A are top views each illustrating a part of an optical disc on which wobble obtained by bi-phase shift keying (BPSK) modulation applied to DVD+RW optical discs, that is, bi-phase-modulated wobble is formed. FIG. 5B is a graph illustrating a conventional radial push-pull signal and a wobble signal detected by an optical disc apparatus according to the present invention, when a wobble signal is reproduced from the optical disc of FIG. 5A. FIG. 6B is a graph illustrating a conventional radial push-pull signal and a wobble signal detected by an optical disc apparatus according to the present invention, when a wobble signal is reproduced from the optical disc of FIG. 5B. The conventional radial push-pull signal, that is, a conventional wobble signal, is obtained by dividing a light beam LB reflected by the recording surface of an optical disc into two parts in direction R, detecting electric signals from the two light beam parts and performing a subtraction on the detected electric signals. The conventional radial push-pull signal corresponds to a signal obtained by summing the first and second difference signals (s1−s2) and (s3−s4) respectively detected by the first and second subtracting operators 31 and 33 of the signal processing unit 30. Here, it is assumed that the value 0 of the conventional wobble signal is sin(ωt) and the value 1 of the conventional wobble signal is sin (ωt+ 180°).

In case of optical discs of FIG. 5A where a groove to be reproduced is not wobbled, but only its adjacent tracks are wobbled, a conventional radial push-pull signal and a wobble signal detected by an optical disc apparatus according to the present invention are as illustrated in FIG. 5B. Referring to FIG. 5B, even when a light beam LB follows the non-wobbled groove, a wobble signal reproduced by a conventional reproduction manner (hereinafter, this wobble signal is referred to as a conventional wobble signal) is greatly affected by the wobbles of adjacent tracks. On the other hand, a wobble signal reproduced by a reproduction manner according to the present invention (hereinafter, this wobble signal is referred to as a wobble signal (according to the present invention)) is hardly affected by the wobbles of adjacent tracks. That is, the present invention can reproduce a wobble signal from which a cross talk component due to the wobbles of adjacent tracks has been nearly removed. FIG. 5B and the graph drawings after FIG. 5B illustrate that a wobble signal detected by an optical disc apparatus according to the present invention is obtained by applying a predetermined gain (ω=1.3) to the first difference signal (s1−s2).

As described with reference to FIGS. 5A and 5B, the present invention can detect a wobble signal from which a cross talk component due to the wobbles of adjacent tracks has been nearly removed. Thus, as illustrated in FIGS. 6A and 6B, even when a wobbled groove is reproduced, a conventional wobble signal is greatly affected by the wobbles of adjacent tracks, whereas the present invention detects a wobble signal from which a cross talk component has been nearly removed.

Figure 7:
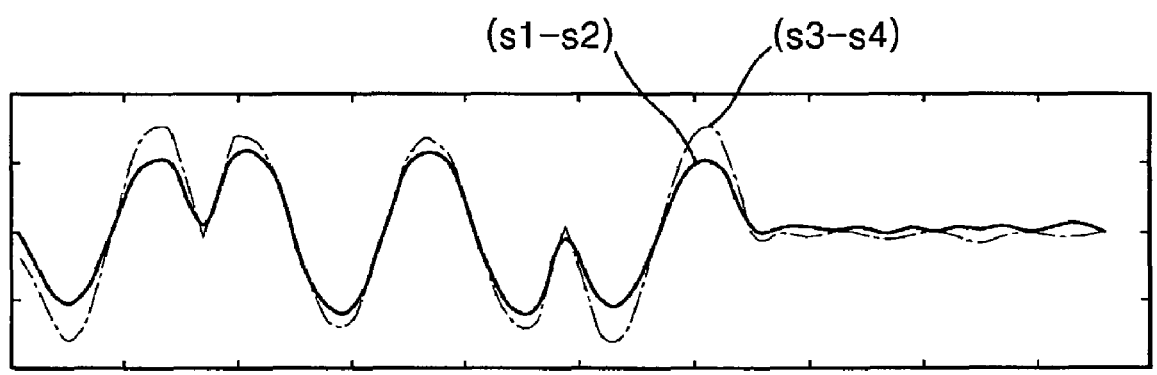
FIG. 7 is a graph illustrating a first difference signal (s1−s2), which is a push-pull signal for the inner light regions of a light beam reflected by the optical disc of FIG. 5A, and a second difference signal (s3−s4), which is a push-pull signal for the outer light regions of the light beam, when the non-wobbled grooves of the optical disc of FIG. 5A are reproduced.

As illustrated in FIG. 7, the first difference signal (s1−s2), which is a push-pull signal for the inner light regions L1 and L2 reflected by an optical disc, and the second difference signal (s3−s4), which is a push-pull signal for the outer light regions L3 and L4 reflected by the optical disc, have identical phases and slightly different amplitudes. Accordingly, the amplitudes of the first and second difference signals (s1−s2) and (s3−s4) having identical phases are summed, such that a conventional wobble signal corresponding to a signal obtained by summing the first and second difference signals (s1−s2) and (s3−s4) is greatly affected by a cross-talk component from the wobbles of adjacent tracks. On the other hand, a wobble signal according to the present invention is hardly affected by a cross talk component generated by the wobbles of adjacent tracks, because the amplitudes of the first and second difference signals (s1−s2) and (s3−s4) are subtracted one from another through an arithmetic operation performed on the first and second difference signals (s1−s2) and (s3−s4) to satisfy Equation 1 supra.

An optical disc apparatus according to the present invention can detect a wobble signal from which a cross-talk from the wobbles of adjacent tracks has been nearly removed, from optical discs on which phase-modulated wobbles are formed as shown in FIGS. 5A and 6A, and likewise for optical discs adopting an amplitude modulation manner, a frequency modulation manner and a saw tooth wobble (STW) manner.

Figure 8A:
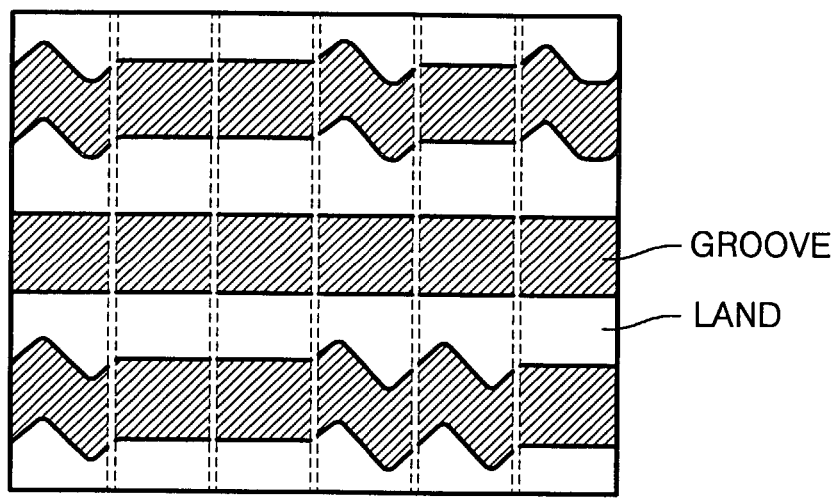
FIG. 8A is a top view of an optical disc on which wobble is formed by an amplitude modulation manner.
Figure 8B:
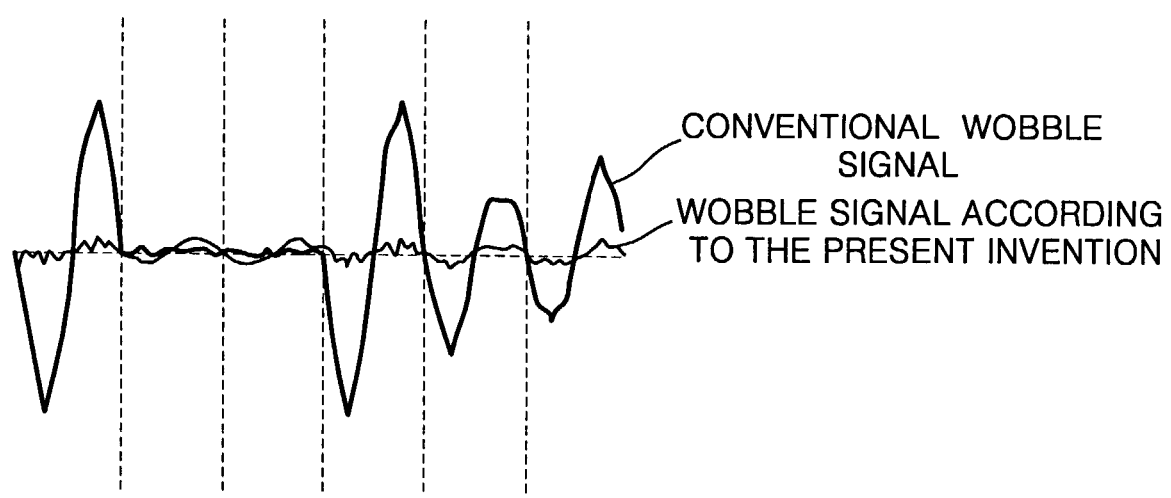
FIG. 8B is a graph illustrating a conventional wobble signal and a wobble signal according to the present invention obtained upon reproduction of the non-wobbled grooves of the optical disc of FIG. 8A.
Figure 9A:
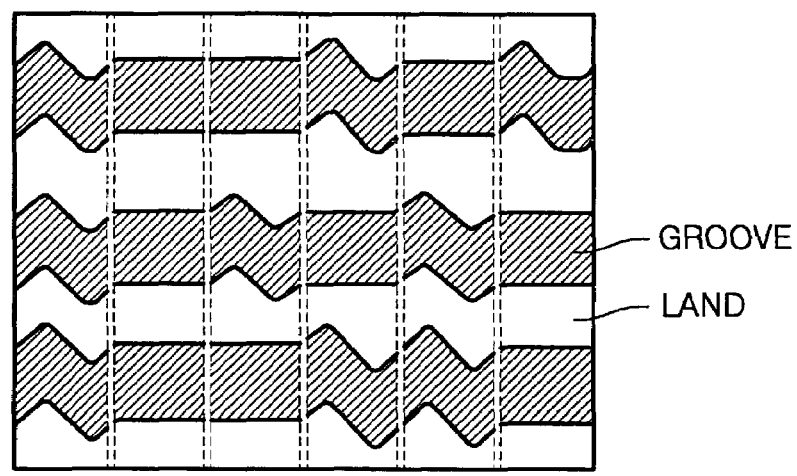
FIG. 9A is a top view of an optical disc on which wobble is formed by the amplitude modulation manner.
Figure 9B:
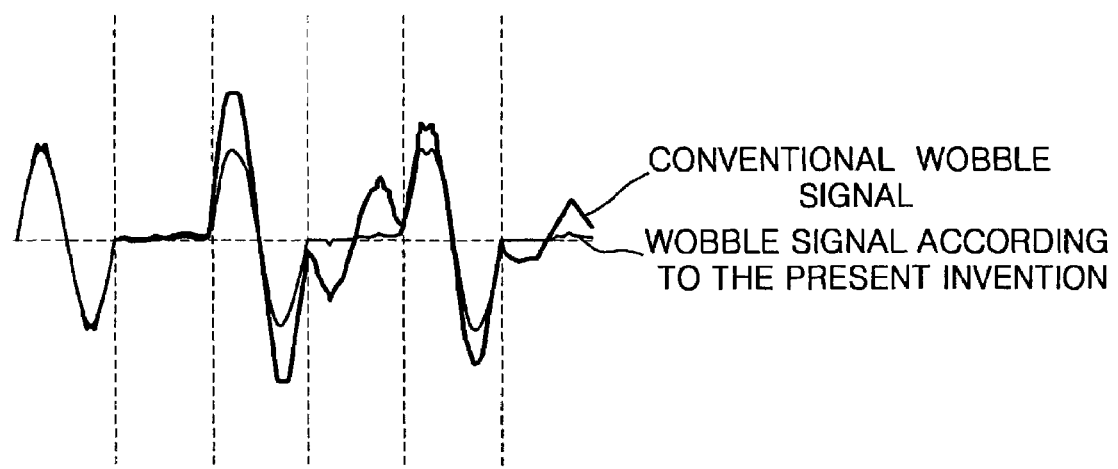
FIG. 9B is a graph illustrating a conventional wobble signal and a wobble signal according to the present invention obtained upon reproduction of the wobbled grooves of the optical disc of FIG. 9A.

FIGS. 8A and 9A each illustrate an optical disc on which wobbles are formed by an amplitude modulation manner. FIGS. 8B and 9B are graphs each illustrating a conventional wobble signal and a wobble signal according to the present invention, the two signals reproduced upon reproduction of the non-wobbled groove of FIG. 8A and upon reproduction of the wobbled grooves of FIG. 9A, respectively.

As illustrated in FIGS. 8A, 8B, 9A and 9B, if an optical disc apparatus according to the present invention is also applied to optical discs on which wobble has been formed by the amplitude modulation manner, it can detect a wobble signal from which a cross-talk from the wobbles of adjacent tracks has been nearly removed.

Figure 10A:
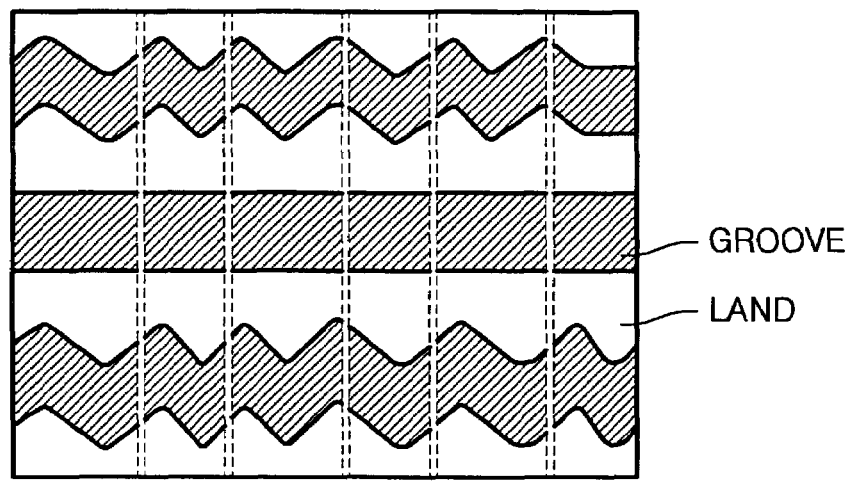
FIG. 10A is a top view of an optical disc on which wobble is formed by a frequency modulation manner.
Figure 10B:
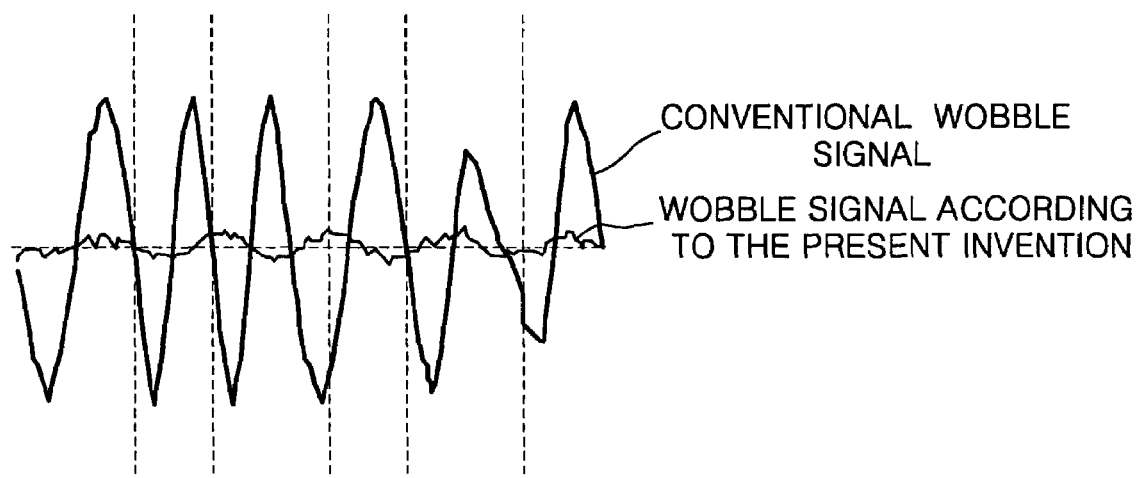
FIG. 10B is a graph illustrating a conventional wobble signal and a wobble signal according to the present invention obtained upon reproduction of the non-wobbled grooves of the optical disc of FIG. 10A.
Figure 11A:
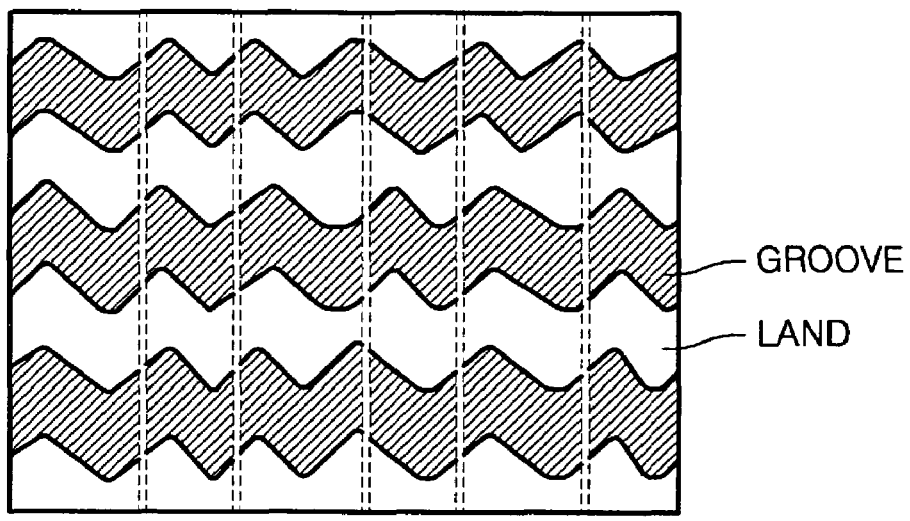
FIG. 11A is a top view of an optical disc on which wobble is formed by the frequency modulation manner.
Figure 11B:
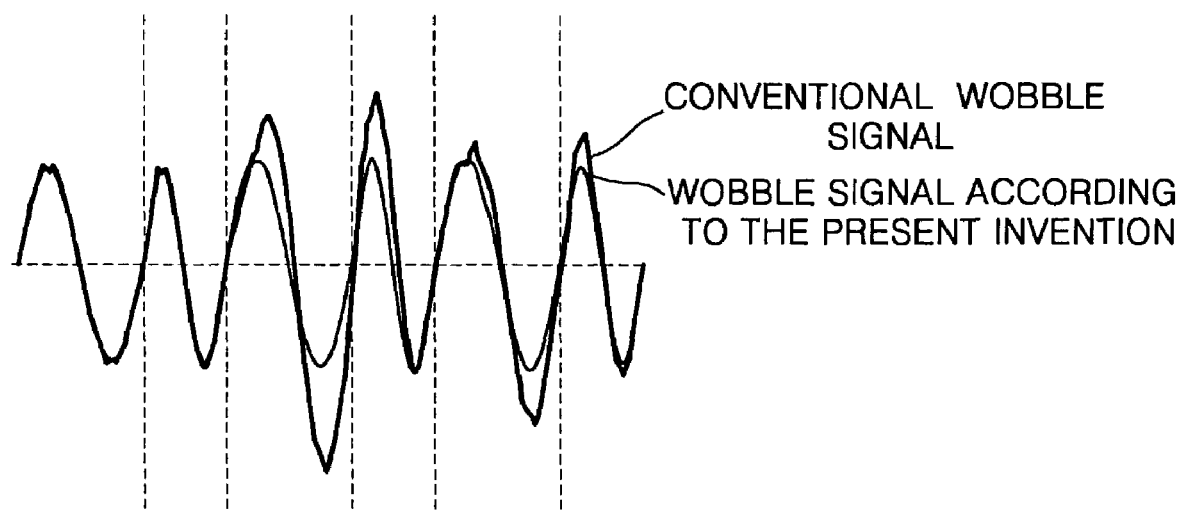
FIG. 11B is a graph illustrating a conventional wobble signal and a wobble signal according to the present invention obtained upon reproduction of the wobbled grooves of the optical disc of FIG. 11A.

FIGS. 10A and 11A each illustrate an optical disc on which wobbles are formed by a frequency modulation manner. FIGS. 10B and 11B are graphs each illustrating a conventional wobble signal and a wobble signal according to the present invention, the two wobble signals reproduced upon reproduction of the non-wobbled groove of FIG. 10A and upon reproduction of a wobbled groove of FIG. 11A, respectively.

As illustrated in FIGS. 10A, 10B, 11A and 11B, if an optical disc apparatus according to the present invention is also applied to optical discs on which wobble has been formed by the frequency modulation manner, it can detect a wobble signal from which a cross-talk generated due to the wobbles of adjacent tracks has been nearly removed.

Figure 12A:
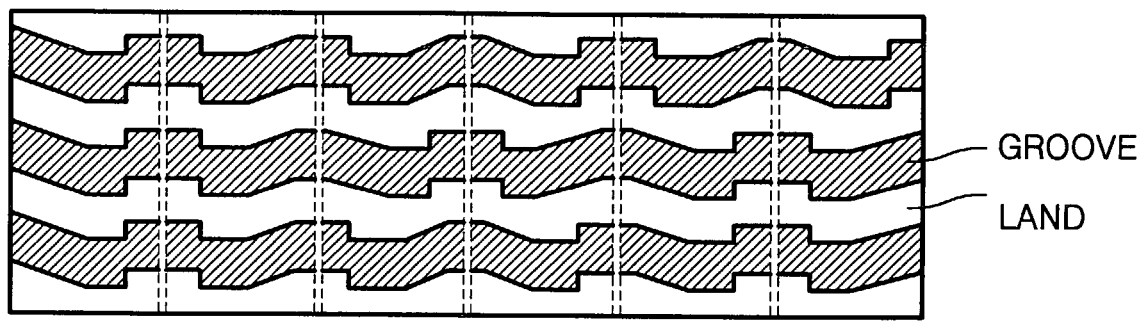
FIG. 12A is a top view of an optical disc on which wobble is formed by a saw tooth wobble (STW) technique.
Figure 12B:
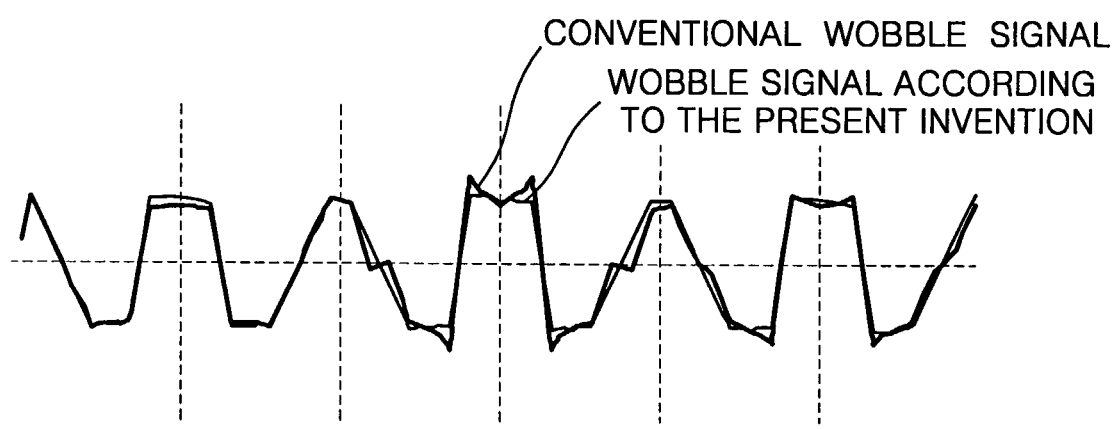
FIG. 12B is a graph illustrating a conventional wobble signal and a wobble signal according to the present invention obtained upon reproduction of the wobbled grooves of the optical disc of FIG. 12A.

FIG. 12A illustrates an optical disc on which wobble is formed by an STW manner. FIG. 12B is a graph illustrating a conventional wobble signal and a wobble signal according to the present invention, the two wobble signals obtained upon reproduction of a wobbled groove of FIG. 12A.

As illustrated in FIGS. 12A and 12B, if an optical disc apparatus according to the present invention is also applied to optical discs on which wobble has been formed by the STW manner, it can detect a wobble signal from which a cross-talk generated due to the wobbles of adjacent tracks has been nearly removed.

The conventional wobble signals and the wobble signals according to the present invention shown in FIGS. 5B, 6B, 8B, 9B, 10B, 11B and 12B are obtained under the condition of Table 1.

TABLE 1

| | | |
|---|---|---|
| Wavelength ($\lambda$) of light source 51 | 400 nm | |
| Numeral aperture (NA) of objective lens | 0.85 | |
| Optical disc | Track pitch: 0.32 μm<br>Groove depth: $\lambda/12$<br>Groove width: 0.17 μm | |
| Channel bit length (T) | 61.7 nm | |
| Wobble | Amplitude modulation | Fundamental amplitude: ±10 nm,<br>Modulated amplitude: 0 nm |
| | Frequency modulation | Fundamental period: 69 T,<br>Modulated period: 46 T |
| | Phase modulation | Fundamental phase: sin ($\omega$ t)<br>Modulated phase: sin ($\omega$ t + 180°) |
| | Saw tooth wobble | Fundamental amplitude: ±10 nm,<br>Frequency: 69 T,<br>Phase: cos ($\omega$ t), square |

As described above, an optical disc apparatus according to the present invention can detect a wobble signal from which a cross-talk due to the wobbles of adjacent tracks has been nearly removed, from an optical disc on which wobbles are formed, regardless of which wobble modulation manner the optical disc uses.

While this invention has been particularly illustrated and described with reference to an embodiment where a predetermined gain ($\zeta$) is applied to the first difference signal (s1−s2), it will be understood by those skilled in the art that various changes in form and details may be made therein without departing from the spirit and scope of the invention as defined by the appended claims. That is, the aspects of the present invention can be provided so as to apply a predetermined gain ($\zeta$) to the second difference signal (s3−s4) or apply a predetermined gain ($\zeta$) to each of the first and second difference signals (s1−s2) and (s3−s4).

An optical disc apparatus according to an embodiment of the present invention can further comprise a circuit to extract only a wobble signal with a specific frequency, for example, a band pass filter (not shown) to remove only a low frequency component or a high frequency component from a wobble signal detected by the signal processing unit 30 according to an applied modulation manner. In this case, a noise component can be pass filter to filter out the low frequency component from a detected wobble signal is used for optical discs on which wobble is formed by either of the amplitude modulation, the frequency modulation and the phase modulation. A band pass filter to filter out the high frequency component from a detected wobble signal is used for optical discs on which wobble is formed by the STW manner. The technique of applying the band pass filters is well known to the technical field of the present invention, so it will not be described in detail.

An optical disc apparatus according to an embodiment of the present invention can further comprise a circuit (not shown) to restore address information from the wobble signal or from a wobble signal with a specific frequency extracted from the wobble signal. Even when an optical disc apparatus according to an embodiment of the present invention further comprises only a circuit to restore address information from a wobble signal without a circuit to extract a wobble signal with a specific frequency, the third subtracting operator 37 of the signal processing unit 30 outputs a very excellent wobble signal as described with reference to the graphs of FIGS. 5B, 6B, 8B, 9B, 10B, 11B and 12B. Accordingly, address information can be restored from the wobble signal without major problems. The address information restoration circuits are also well known to the technical field of the present invention, so they will not be described in detail.

According to the present invention, when a wobble signal is reproduced from an optical disc manufactured by a wobble modulation manner, a wobble signal is prevented from being degraded due to the interference (cross talk) from the wobbles of adjacent tracks, even though the track pitch of the optical disc is reduced to improve the recording density.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc apparatus for eliminating an error from a wobble signal and for addressing using the wobble signal, the apparatus comprising:
   a light division and detection device to divide a light beam projected onto an optical disc and reflected by the optical disc, into at least four light regions in a direction corresponding to a radial direction of the optical disc, and to detect the light regions; and
   a signal processing unit to detect a first difference signal by performing a subtraction on detection signals for inner light regions of the detected light beam, to detect a second difference signal by performing a subtraction on detection signals for outer light regions of the detected light beam, and to detect the wobble signal by performing a subtraction on the first and second difference signals after applying a predetermined gain to the first and second difference signals,
   wherein the wobble signal is prevented from being degraded due to cross-talk from wobbles of adjacent tracks on the optical disc,
   wherein the signal processing unit comprises:
      a first subtracting operator to perform subtraction on detection signals for the inner light regions of the divided and detected regions to obtain the first difference signal;
      a second subtracting operator to perform subtraction on detection signals for the outer light regions of the divided and detected regions to obtain the second difference signal;
      a third subtracting operator to perform subtraction on the first and second difference signals to obtain the wobble signal; and
      a gain adjuster to apply a predetermined gain to the first and second difference signals,
   wherein the signal processing unit detects the wobble signal by performing the subtraction of the first and second difference signals after applying the predetermined gain to the first and second difference signals,
   wherein the wobble signal detected by the signal processing unit is represented by the following equation:

wobble signal=$\zeta \cdot (s3-s4) - \zeta \cdot (s1-s2)$ wherein $\zeta$ is the predetermined gain applied by the gain adjuster to the first and second difference signals when the first difference signal denotes as s1−s2 and the second difference signal denotes as s3−s4.

2. The optical disc apparatus according to claim 1, wherein the light division and detection device corresponds to a photodetector to divide an incident light beam into at least four light regions in the direction corresponding to the radial direction of an optical disc and to detect the light regions.

3. The optical disc apparatus according to claim 1, wherein the light division and detection device comprises:
   a diffraction element to divide an incident light beam into at least four light regions in the direction corresponding to the radial direction of the optical disc; and
   a photodetector to receive the light regions of which the light beam is divided by the diffraction element and perform a photoelectric conversion on the light regions.

4. The optical disc apparatus according to claim 1, wherein the optical disc has wobbles formed by amplitude modulation, frequency modulation manner, a phase modulation, or a saw tooth wobble manner.

5. The optical disc apparatus according to claim 1, wherein the optical disc has wobbles formed by amplitude modulation, frequency modulation, phase modulation, or a saw tooth wobble manner.

6. The optical disc apparatus according to claim 2, wherein the optical disc has wobbles formed by amplitude modulation, a frequency modulation, phase modulation, or a saw tooth wobble manner.

7. The optical disc apparatus according to claim 3, wherein the optical disc has wobbles formed by amplitude modulation, a frequency modulation, phase modulation, or a saw tooth wobble manner.

8. A method for eliminating an error from a wobble signal and for addressing using the wobble signal, the method comprising:
   dividing a light beam projected onto an optical disc formed wobble and reflected by the optical disc into at least four light regions in the direction corresponding to the radial direction of the optical disc and detecting the light regions; and
   detecting the wobble signal by performing a subtraction on first and second difference signals after applying a predetermined gain to the first and second difference signals, the first difference signal obtained by performing a subtraction on detection signals for inner light regions of the detected light beam and the second difference signal obtained by performing a subtraction on detection signals for outer light regions of the detected light beam,
   wherein the wobble signal is prevented from being degraded due to cross-talk from wobbles of adjacent tracks on the optical disc and
   wherein the wobble signal is represented by the following equation:

wobble signal=$(s3-s4)-\zeta \cdot (s1-s2)$ wherein $\zeta$ is the predetermined gain applied to at least one of the first and second difference signals when the first difference signal denotes as s1−s2 and the second difference signal denotes as s3−s4.

9. The method according to claim 8, wherein the optical disc has wobbles formed by amplitude modulation, a frequency modulation, phase modulation, or a saw tooth wobble manner.

10. The method according to claim 8, wherein the optical disc has wobbles formed by amplitude modulation, a frequency modulation, phase modulation, or a saw tooth wobble manner.

11. The optical disc apparatus according to claim 3, wherein the diffraction element comprises a hologram element.

12. The optical disc apparatus according to claim 3, wherein the photodetector comprises at least four separate photo detectors.

13. The optical disc apparatus according to claim 3, wherein the photodetector comprises a single photodetector having isolated light receiving regions.

14. The optical disc apparatus according to claim 1, wherein the predetermined gain $\zeta=1.3$.

15. The optical disc apparatus according to claim 1, further comprising a circuit having a band pass filter to extract a wobble signal having only a low frequency component or a high frequency component from the wobble signal detected by the signal processing unit.

16. The optical disc apparatus according to claim 15, wherein the band pass filter filters out the low frequency component from the detected wobble signal formed by amplitude modulation, frequency modulation or phase modulation.

17. The optical disc apparatus according to claim 15, wherein the band pass filter filters out the high frequency component from the detected wobble signal formed by saw tooth modulation.

18. The optical disc apparatus according to claim 1, further comprising a circuit to restore address information from the wobble signal.

19. The optical disc apparatus according to claim 15, further comprising a circuit to restore address information from the extracted wobble signal with the low frequency component or the high frequency component.

20. An optical apparatus for eliminating an error from a wobble signal and for addressing using the wobble signal, the apparatus comprising:
 a light division and detection unit to divide a light beam projected onto an optical disc and reflected by the optical disc into two inner sections and two outer sections; and
 a signal processing unit to detect the wobble signal by converting the combination of the two inner sections of the reflected light beam into a first difference signal and the combination of the two outer sections of the reflected light beam into a second difference signal and then to convert the combination of the first difference signal and the second difference signal into the detected wobble signal by performing a subtraction on the first and second difference signals after applying a predetermined gain to the second difference signal,
 wherein the wobble signal is prevented from being degraded due to cross-talk from wobbles of adjacent tracks on the optical disc and
 wherein the wobble signal detected by the signal processing unit is represented by the following equation:

wobble signal=$(s3\text{-}s4)-\zeta\cdot(s1\text{-}s2)$ wherein $\zeta$ is the predetermined gain applied to at least one of the first and second difference signals when the first difference signal denotes as s1−s2 and the second difference signal denotes as s3−s4.

21. A method for eliminating an error from a wobble signal and for addressing using the wobble signal, the method comprising:
 dividing a light beam projected onto an optical disc formed wobble and reflected by the optical disc into two inner sections and two outer sections;
 detecting the wobble signal by converting the combination of the two inner sections of the reflected light beam into a first difference signal and the combination of the two outer sections of the reflected light beam into a second difference signal; and
 converting the combination of the first difference signal and the second difference signal into the detected wobble signal by performing a subtraction on the first and second difference signal after applying a predetermined gain to the second difference signal,
 wherein the wobble signal is prevented from being degraded due to cross-talk from the wobbles of adjacent tracks on the optical disc,
 wherein the wobble signal detected is represented by the following equation:

wobble signal=$(s3\text{-}s4)-\zeta\cdot(s1\text{-}s2)$ wherein $\zeta$ is the predetermined gain applied to at least one of the first and second difference signals when the first difference signal denotes as s1−s2 and the second difference signal denotes as s3−s4.

* * * * *